L. O. ROOT.
Safety Runners for Railroad Cars.

No. 166,301. Patented Aug. 3, 1875.

Attest:   Inventor.
          Lawrence O. Root,
          By James L. Norris,
          Atty.

UNITED STATES PATENT OFFICE.

LAWRENCE O. ROOT, OF MINNEAPOLIS, MINNESOTA.

IMPROVEMENT IN SAFETY-RUNNERS FOR RAILROAD-CARS.

Specification forming part of Letters Patent No. 166,301, dated August 3, 1875; application filed June 11, 1875.

*To all whom it may concern:*

Be it known that I, LAWRENCE O. ROOT, of Minneapolis, in the county of Hennepin and State of Minnesota, have invented certain new and useful Improvements in Safety-Runners for Railroad-Cars, of which the following is a specification:

My invention consists in constructing the car-truck with a narrow runner suspended on each side of the same, being about on a line with the top of the rail, in such manner as to form a safety-guard which will prevent passengers from accidentally falling under the car-wheels in getting on and off the cars, and will also serve to secure the cars on the road-bed, if the wheels should be thrown off the track, as fully hereinafter set forth.

Figure 1:
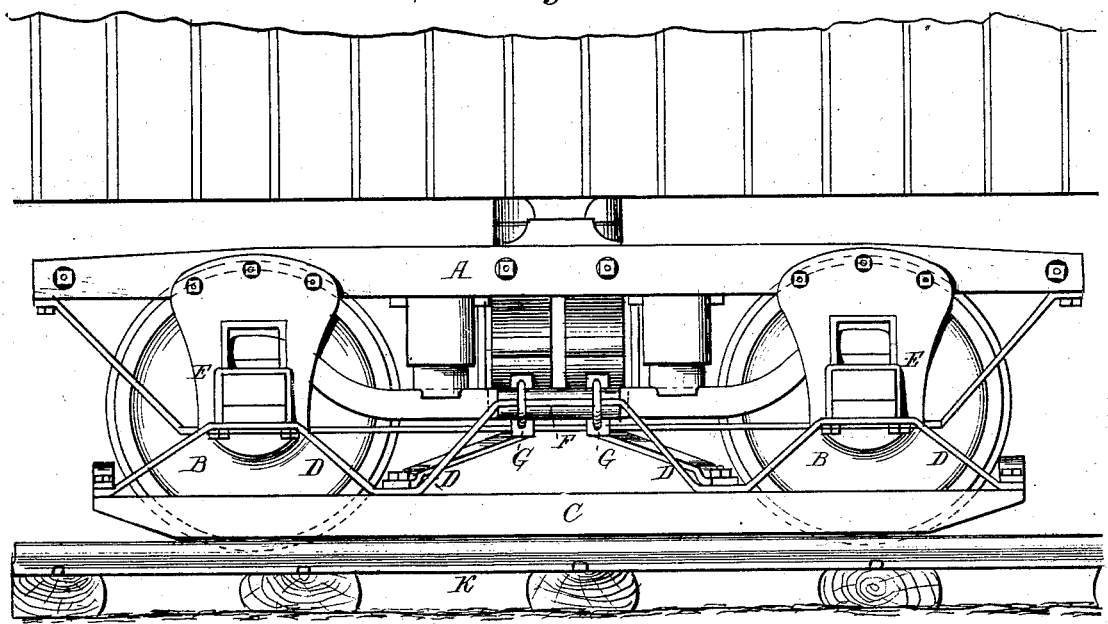
Figure 2:
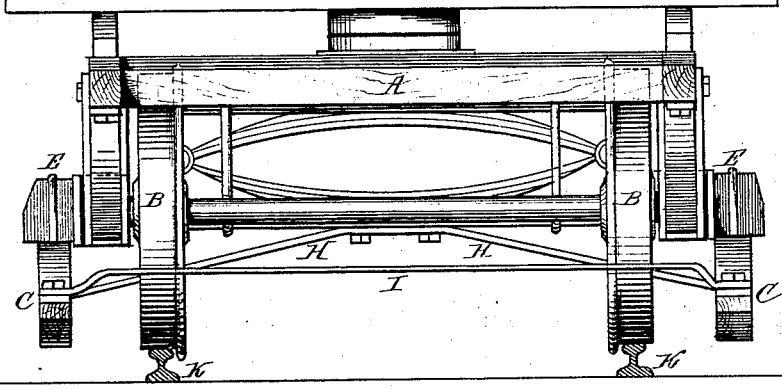

In the drawings, Figure 1 represents a side elevation of the car, showing my improvements; and Fig. 2, a front view of the same.

The letter A represents a truck of an approved construction, mounted upon the wheels B B in the usual manner. C C represent the runners, consisting of narrow bars of steel or iron, secured to the truck and the journal-bearing of the axles by means of a flat bar, D, of iron or steel, bent so as to form a series of three standards, as shown, which are connected to the runners by means of bolts, rivets, screws, or other suitable means, and to the journal-bearings by means of U-shaped braces E, bolted over the bearing-blocks and extending through the supporting-bar D. The bar D is secured to the truck-frame by means of the binding-blocks F F and the U-shaped braces G G, which are bolted over said blocks and bar D and the frame of the truck A. Each runner is braced to the bottom of the truck by means of the two bent stays H H, which extend from one to the other underneath the truck, and which are secured to the truck-frame by means of bolts, rivets, screws, or other equivalent means. The runners are connected at each end by means of bars I I, extending across the car at the front and rear.

The runners are suspended edgewise and in such position that the lower edges of the same will be on or about the level of the top of the rails when the wheels of the car are on the track, so that, if the wheels are thrown off by accident, said runners will drop and rest upon the sleepers, and slide thereon until the train is stopped.

By securing the runners outside of the wheels, so as to project at each side of the car-truck, it will be seen that, besides serving as a security against the cars being thrown from the road-bed, the runners form an efficient safety-guard, which will prevent passengers and others from accidentally falling between the wheels, and thus materially diminish the accidents attendant upon railway travel.

I am aware that safety-runners have been employed extending longitudinally under the cars between the wheels, for the single purpose of supporting the cars on the road-bed in case the wheels are thrown off the rail, and hence I do not claim, broadly, the safety-runners attached to a car; but no such runners have ever been arranged outside the wheels and car-track in such position as to answer both as safety-runners and as safety-guard, to prevent persons from falling between the wheels; and I therefore claim—

In combination with a car-truck, the runners C C, consisting of narrow bars suspended edge downward from each side of the truck or pedestals outside of the wheels, forming a safety-guard to prevent persons from falling between the wheels of the cars, and confining the cars to the road-bed in case the wheels are thrown from the rails, substantially as described.

In testimony that I claim the foregoing I have hereunto set my hand in the presence of the subscribing witnesses.

LAWRENCE ODELL ROOT.

Witnesses:
W. F. THOMPSON,
CHAS. A. PLACE.